United States Patent
Wu (10) Patent No.: US 8,837,630 B2
(45) Date of Patent: Sep. 16, 2014

(54) SIGNAL TRANSMISSION CIRCUIT AND METHOD FOR DETECTING SIGNAL TRANSMISSION INTERFACE

(71) Applicant: Phison Electronics Corp., Miaoli (TW)

(72) Inventor: Jen-Chu Wu, New Taipei (TW)

(73) Assignee: Phison Electronics Corp., Miaoli (TW)

( * ) Notice: Subject to any disclaimer, the term of this patent is extended or adjusted under 35 U.S.C. 154(b) by 13 days.

(21) Appl. No.: 13/853,056

(22) Filed: Mar. 29, 2013

(65) Prior Publication Data

US 2014/0219382 A1 Aug. 7, 2014

(30) Foreign Application Priority Data

Feb. 1, 2013 (TW) .............................. 102103967 A (51) Int. Cl.
  *H04L 27/00* (2006.01)
  *H04L 25/02* (2006.01)
(52) U.S. Cl.
  CPC .................................... *H04L 25/026* (2013.01)
  USPC ........................................................ 375/295
(58) Field of Classification Search
  CPC .......................... G06F 11/3089; G06F 13/4081
  USPC ........................................................ 375/295
  See application file for complete search history.

(56) References Cited

U.S. PATENT DOCUMENTS

| 8,489,781 | B1* | 7/2013 | An et al. ........................ 710/15 |
| 8,656,074 | B2* | 2/2014 | Lai et al. ........................ 710/62 |
| 2012/0153891 | A1* | 6/2012 | Yang et al. .................... 320/107 |
| 2012/0290761 | A1* | 11/2012 | Chen et al. .................... 710/305 |
| 2013/0246667 | A1* | 9/2013 | Markel et al. .................. 710/15 |

* cited by examiner

*Primary Examiner* — Juan A Torres
(74) *Attorney, Agent, or Firm* — Jianq Chyun IP Office (57) ABSTRACT

A signal transmission circuit of an electronic device is provided. The electronic device is coupled to a signal reception circuit of a host via the signal transmission circuit. The signal transmission circuit includes a driving circuit module and a signal detection module. The driving circuit module provides at least one initialized signal and a detection signal. The initialized signal is output prior to the detection signal. The signal detection module is coupled to the signal reception circuit via a signal detection terminal. The initialized signal reduces a signal reference level of a reception terminal of the signal reception circuit. The signal detection module determines the type of the transmission interface of the signal reception circuit according to whether the detection signal of the signal detection terminal satisfies a predetermined threshold value. Furthermore, a method for detecting the signal transmission interface is provided.

25 Claims, 7 Drawing Sheets

SIGNAL TRANSMISSION CIRCUIT AND METHOD FOR DETECTING SIGNAL TRANSMISSION INTERFACE

CROSS-REFERENCE TO RELATED APPLICATION

This application claims the priority benefit of Taiwan application serial no. 102103967, filed on Feb. 1, 2013. The entirety of the above-mentioned patent application is hereby incorporated by reference herein and made a part of this specification.

BACKGROUND

1. Technical Field

The disclosure relates to an electronic circuit and a method for detecting a transmission interface. Particularly, the disclosure relates to a signal transmission circuit having an initialisation function, and a method for detecting a signal transmission interface.

2. Related Art

Generally, when signals are transmitted between electronic devices, a communication link has to be established between the two electronic devices according to a standard of a transmission interface thereof, and after the communication link is successfully established, signal transmission between the two electronic devices can be implemented. Taking a universal serial bus 3.0 (USB 3.0) as an example, in a system of the USB 3.0, the electronic device serving as a transmitter is required to detect a standard of the transmission interface of a host serving as a receiver, so as to determine whether the link is required to have the USB 3.0 mode or is compatible backwards to a USB 2.0 mode. However, regarding a circuit structure of a signal reception circuit of the conventional receiver, during a period that a signal transmission circuit of the transmitter sends a detection pulse to the signal reception circuit, a voltage level of the detection pulse is clamped by the signal reception circuit, which may result in a fact that the signal transmission circuit detects an error voltage level and misjudges the standard of the transmission interface used by the host serving as the receiver.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The disclosure is directed to a signal transmission circuit, which is capable of detecting a type of a signal transmission interface of a signal reception circuit coupled thereto.

The disclosure is directed to a method for detecting a signal transmission interface, which is capable of detecting a type of a signal transmission interface of a signal reception circuit.

The disclosure provides a signal transmission circuit of an electronic device. The electronic device is coupled to a signal reception circuit of a host via the signal transmission circuit. The signal transmission circuit includes a driving circuit module and a signal detection module. The driving circuit module provides at least one initialized signal and a detection signal. The initialized signal is output prior to the detection signal. The signal detection module is coupled to the driving circuit module, and is coupled to the signal reception circuit via a signal detection terminal. The signal detection module is configured to detect a type of a signal transmission interface of the signal reception circuit. The initialized signal reduces a signal reference level of a reception terminal of the signal reception circuit. The signal detection module determines the type of a signal transmission interface of the signal reception circuit according to whether the detection signal satisfies a predetermined threshold value at the signal detection terminal.

The disclosure provides a method for detecting a signal transmission interface, which is adapted to a signal transmission circuit of an electronic device. The signal transmission circuit is coupled to a signal reception circuit of a host via a signal detection terminal. The method for detecting the signal transmission interface includes following steps. At least one initialized signal is output during an initialization period to reduce a signal reference level of a reception terminal of the signal reception circuit. A detection signal is output during an interface detection period to detect a type of the transmission interface of the signal reception circuit. A type of the signal transmission interface of the signal reception circuit is determined according to whether the detection signal satisfies a predetermined threshold value at the signal detection terminal. The initialized signal is output prior to the detection signal.

According to the above descriptions, in the disclosure, the signal transmission circuit can initialize the signal reception circuit coupled thereto by using an initialization pulse, so as to detect the type of the signal transmission interface of the signal reception circuit during the interface detection period.

These and other exemplary embodiments, features, aspects, and advantages of the invention will be described and become more apparent from the detailed description of exemplary embodiments when read in conjunction with accompanying drawings.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A plurality of embodiments are provided below to describe the disclosure, though the disclosure is not limited to the provided embodiments, and the embodiments can also be suitably combined. A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, a term "signal" refers to at least a current, a voltage, an electric charge, a temperature, data or any other one or a plurality of signals.

Figure 1A:
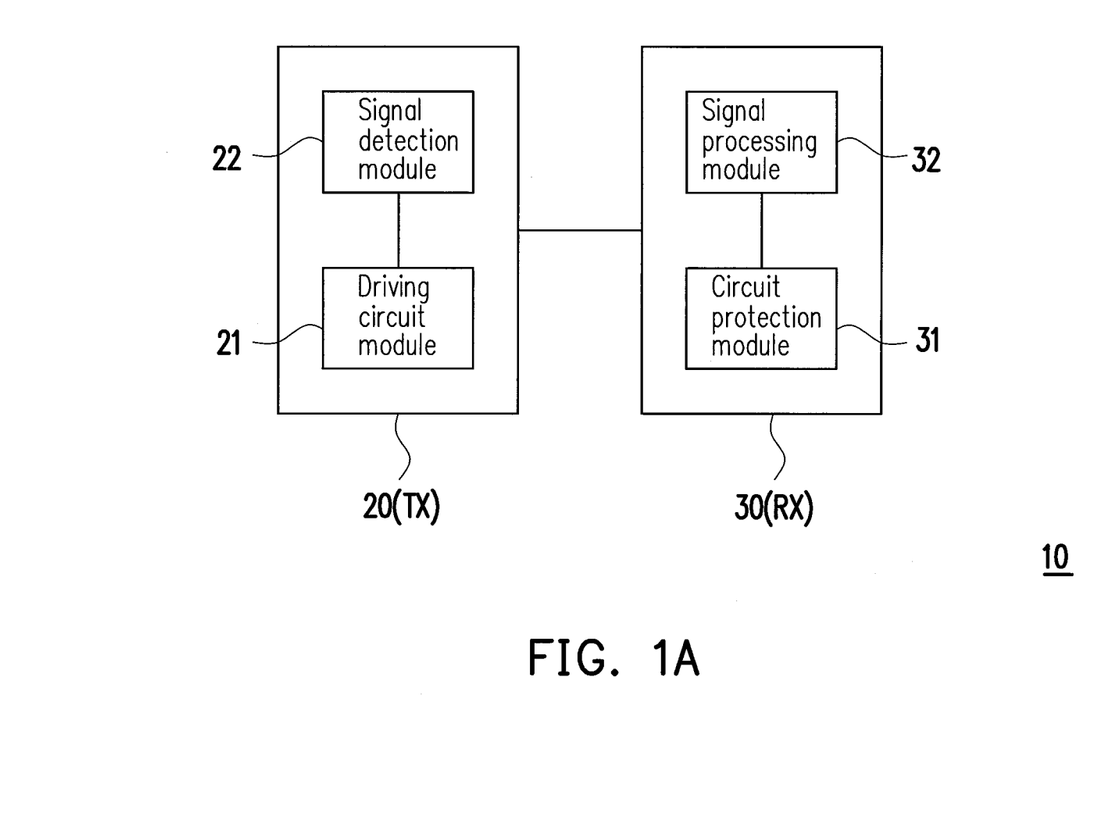
FIG. 1A is a schematic diagram of a signal transmission system between two electronic devices according to an embodiment of the disclosure.

FIG. 1A is a schematic diagram of a signal transmission system between two electronic devices according to an embodiment of the disclosure. Referring to FIG. 1A, a signal transmission system 10 of the present embodiment includes a host serve as a signal receiver RX and an electronic device serving as a signal transmitter TX. The host can be any system capable of storing data, such as a computer system, a digital camera, a video camera, a communication device, an audio player or a video player, etc. The electronic device can be any device capable of storing data, such as a flash drive, a memory card or a solid state drive (SSD), etc. Generally, when signal transmission is performed between the signal transmitter TX and the signal receiver RX, a communication link has to be first established between the two electronic devices according to a standard of a transmission interface thereof, and after the communication link is successfully established, signal transmission between the two electronic devices can be implemented. The standard of the transmission interface serving as an input output interface includes a serial advanced technology attachment (SATA) standard, an institute of electrical and electronic engineers (IEEE) 1394 standard, a peripheral component interconnect express (PCI express) standard, a universal serial bus (USB) standard, a secure digital (SD) interface standard, a memory stick (MS) interface standard, a multi media card (MMC) interface standard, a compact flash (CF) interface standard, an integrated device electronics (IDE) standard or other suitable standards.

In the present embodiment, the electronic device is coupled to a signal reception circuit 30 of the host through a signal transmission circuit 20. The signal transmission circuit 20 of the signal transmitter TX may include a driving circuit module 21 and a signal detection module 22. The signal reception circuit 30 of the signal receiver RX may include a circuit protection module 31 and a signal processing module 32. The driving circuit module 21 provides at least one initialized signal and a detection signal. In the present embodiment, the detection signal is used to detect a type of the transmission interface of the signal reception circuit 30, and the initialized signal is first used to initialize the signal reception circuit 30 before the detection signal is used to detect the signal reception circuit 30, so as to increase accuracy of the interface detection. Therefore, in the present embodiment, the initialized signal is output prior to the detection signal. The signal detection module 22 is coupled to the driving circuit module 21 and the signal reception circuit 30, and detects the type of the transmission interface of the signal reception circuit 30. In the present embodiment, after the driving circuit module 21 initializes the signal reception circuit 30, a signal reference level of a reception terminal of the signal reception circuit 30 is decreased. Then, the signal detection module 22 determines the type of the transmission interface of the signal reception circuit 30 according to whether the detection signal satisfies a predetermined threshold value at the signal detection terminal of the signal transmission circuit 20.

Figure 1B:
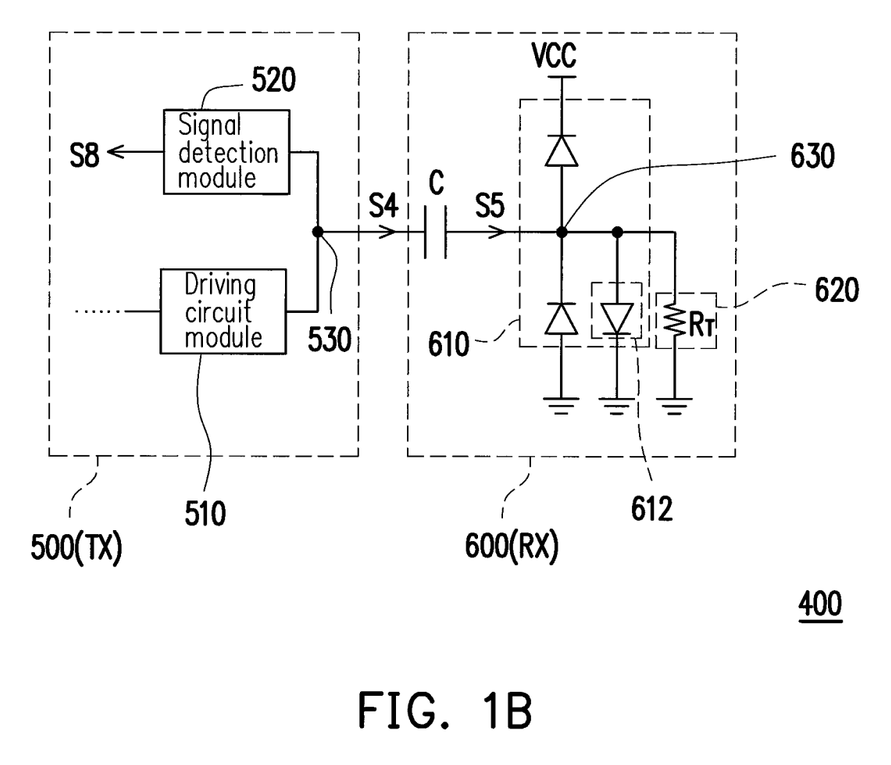
FIG. 1B is a schematic diagram of a possible implementation of internal circuit structures of a signal transmission circuit and a signal reception circuit according to an embodiment of the disclosure.

In detail, taking a USB 3.0 standard as an example, in the USB 3.0 system, after the electronic device is coupled to the host, the signal transmission circuit 20 detects whether the host uses the USB 3.0 interface communication standard, so as to determine whether the link is required to have the USB 3.0 operation mode or is compatible backwards to a USB 2.0 operation mode. FIG. 1B is a schematic diagram of a possible implementation of internal circuit structures of the signal transmission circuit and the signal reception circuit according to an embodiment of the disclosure. In the present embodiment, a circuit protection module 610 is, for example, an electrostatic discharge (ESD) protection circuit, and a whole circuit of a signal processing module 620 can be equivalent to an equivalent input resistor $R_T$. In the USB 2.0 mode, the equivalent input resistor $R_T$ has a high impedance, and in the USB 3.0 mode, the equivalent input resistor $R_T$ is about 50 ohms, which has a lower impedance compared with that of the USB 2.0 mode. Therefore, the signal transmission circuit 500 can determine whether the link is required to have the USB 3.0 operation mode or is compatible backwards to a USB 2.0 operation mode according to the impedance value of the equivalent input resistor $R_T$.

Figure 2:
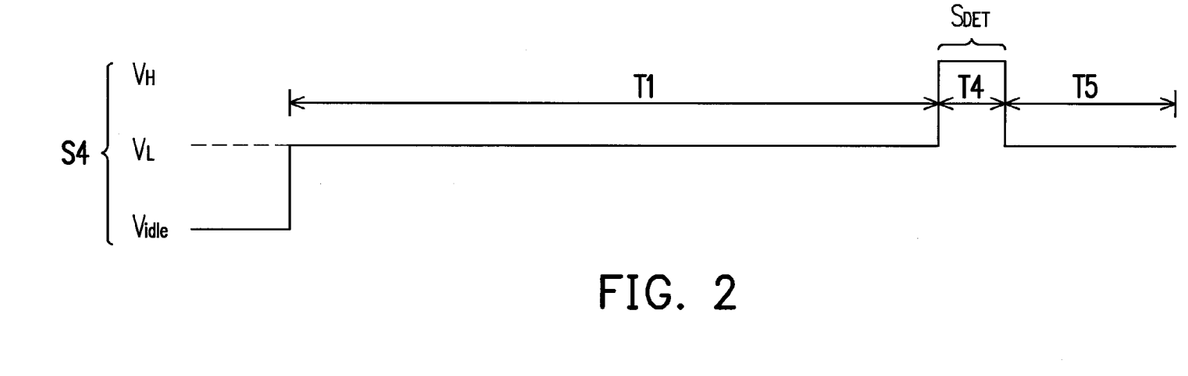
FIG. 2 is a schematic waveform diagram of an output signal S4 according to a related technique of the disclosure.

In a related technique of the disclosure, the signal transmission circuit 400 detects whether the equivalent input resistor $R_T$ has the high impedance or the low impedance by using an output signal S4 of FIG. 2. In the present embodiment, during a rising period T1, the driving circuit module 510 first stablizes the output signal S4 to a first voltage level $V_L$, i.e. a stable voltage level of a common mode in the present exemplary embodiment. Then, the driving circuit module 510 further generates a detection signal $S_{DET}$ during an interface detection period T4, where the detection signal is, for example, a detection pulse, and a voltage level thereof is between the first voltage level $V_L$ and a second voltage level $V_H$. During the interface detection period T4, the signal transmission circuit 500 can detect the detection signal $S_{DET}$ at a signal detection terminal 530 through the signal detection module 520, so as to determine whether the equivalent input resistor $R_T$ has the high impedance or the low impedance. If the equivalent input resistor $R_T$ has the high impedance, the signal detection module 520 outputs a determination result signal S8, and the electronic device can transmit signals to the host through a communication manner complied with the USB 2.0 transmission standard according to the determination result signal S8. Conversely, if the equivalent input resistor $R_T$ has the low impedance, the electronic device can transmit signals to the host through a communication manner complied with the USB 3.0 transmission standard according to the determination result signal S8.

Figure 3:
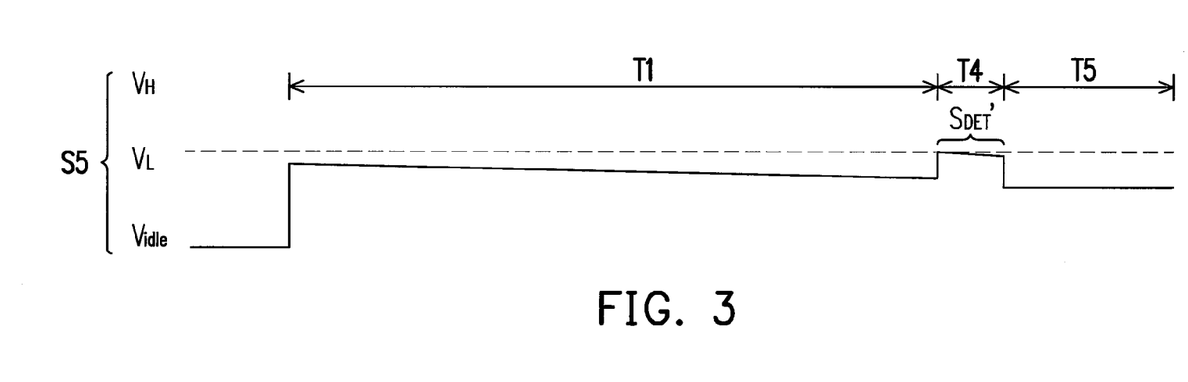
FIG. 3 illustrates a signal waveform of an input signal S5 at a signal reception terminal 630 when an equivalent input resistor $R_T$ has a high impedance.

However, in the present embodiment, the signal reception circuit 600 generally includes a direct current (DC) blocking capacitor C. Therefore, according to a circuit structure of the current signal reception circuit 600, the voltage level of the detection signal $S_{DET}$ is probably clamped by the circuit protection module 610. Further, FIG. 3 illustrates a signal waveform of an input signal S5 at a signal reception terminal 630 when the equivalent input resistor $R_T$ has the high impedance. In the present embodiment, since the circuit protection module 610 includes a unidirectional conductive device 612 forward facing to the ground, for example, a diode disclosed in FIG. 1B, during the interface detection period T4, the detection signal $S_{DET}'$ of the input signal S5 is clamped to the first voltage level $V_L$. Therefore, according to characteristics of capacitor, the detection signal $S_{DET}'$ at another end of the DC blocking capacitor C is also clamped to a corresponding voltage level, which may result in a fact that the signal detection module 520 detects an error voltage level, and misjudges the transmission interface standard used by the host. In the related technique, the detection signal $S_{DET}'$ is clamped to the first voltage level $V_L$, though according to different design structures of the signal reception circuit 600, the detection signal $S_{DET}'$ can be clamped to a specific voltage level different to the first voltage level $V_L$ during the interface detection period T4. Moreover, in some embodiments, the unidirectional conductive device forward facing to the ground can also be a varistor.

Figure 1C:
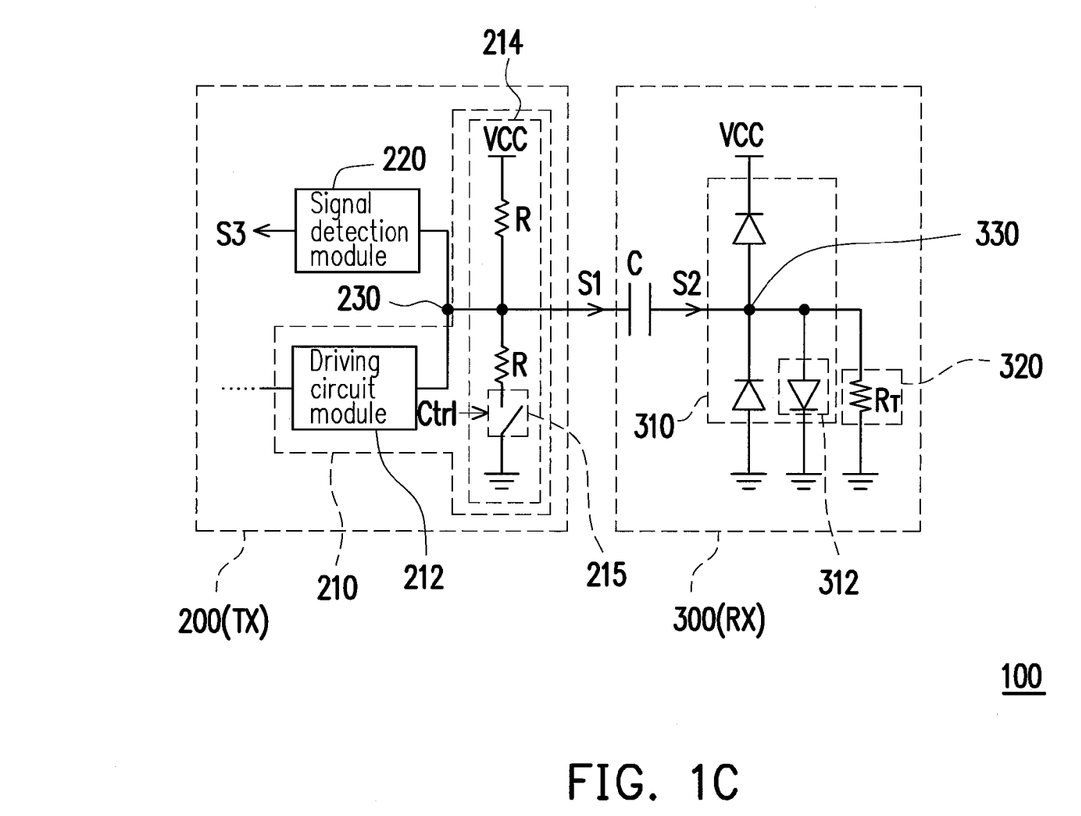
FIG. 1C is a schematic diagram of a possible implementation of internal circuit structures of a signal transmission circuit and a signal reception circuit of FIG. 1A.
Figure 4:
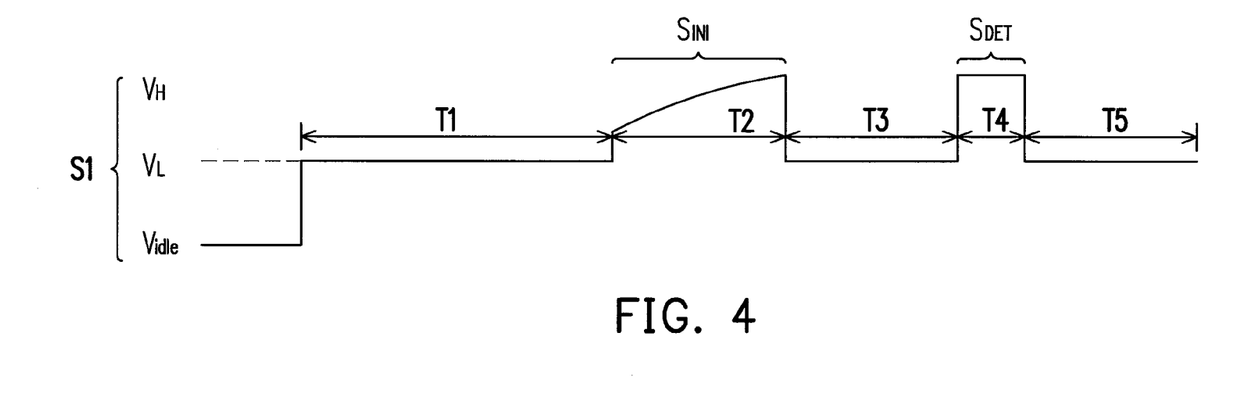
FIG. 4 is a schematic waveform diagram of an output signal S1 of FIG. 1C.
Figure 5:
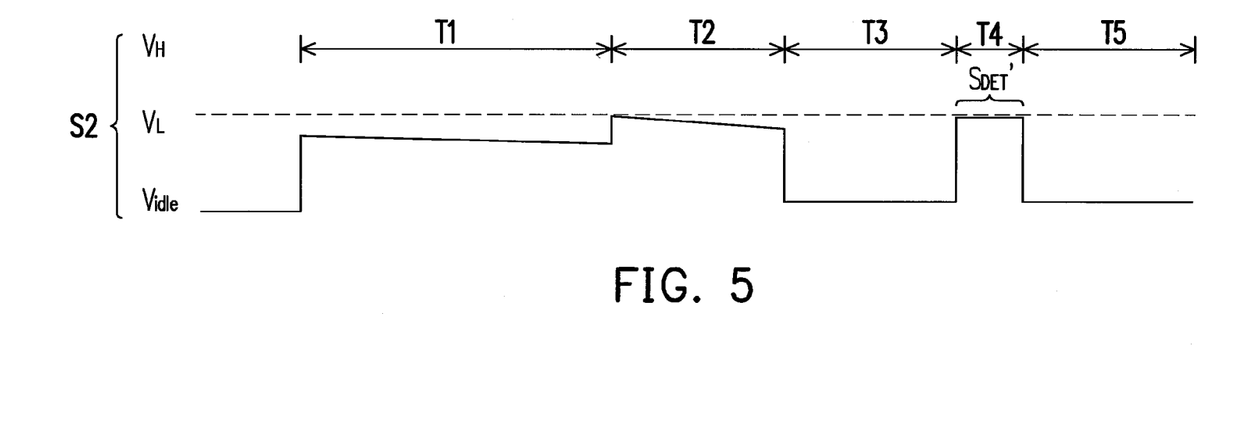
FIG. 5 illustrates a signal waveform of an input signal S2 at a signal reception terminal 330 when an equivalent input resistor $R_T$ has a high impedance.

In the disclosure, the exemplary embodiment of FIG. 1A provides the signal transmission circuit 20 having an initialization function, which can detect the transmission interface standard used by the host to avoid misjudgement. FIG. 1C is a schematic diagram of a possible implementation of internal circuit structures of the signal transmission circuit and the signal reception circuit of FIG. 1A. FIG. 4 is a schematic waveform diagram of an output signal S1 of FIG. 1C, and FIG. 5 illustrates a signal waveform of an input signal S2 at a signal reception terminal 330 when the equivalent input resistor $R_T$ has the high impedance. Referring to FIG. 1, FIG. 4 and FIG. 5, the DC blocking capacitor C is generally disposed at the side of the signal receiver RX, and FIG. 4 illustrates a signal waveform at a left end 230 of the DC blocking capacitor C, and FIG. 5 illustrates a signal waveform at a right end 330 of the DC blocking capacitor C. In the present embodiment, the output signal S1 includes a rising period T1, an initialization period T2, a pre-detection period, an interface detection period T4 and a discharging period T4. The pre-detection period T3 is between the initialization period T2 and the interface detection period T4. During the initialization period T2, the output signal S1 includes a single initialization pulse $S_{IN}'$ with a voltage level between the first voltage level $V_L$ and the second voltage level $V_H$. In the present embodiment, the driving circuit module 210 initializes the signal reception circuit 300 by using the initialization pulse $S_{INI}$, so as to reduce a signal reference level of the signal reception terminal 330 of the signal reception circuit 300. In the present embodiment, the initialization operation is to decrease a signal reference level of the input signal S2 of the pre-detection period T3 to a third voltage level $V_{idle}$. Then, the signal detection module 220 determines a type of the signal transmission interface of the signal reception circuit 300 according to whether the detection signal $S_{DET}$ satisfies a predetermined threshold value at the signal detection terminal 230 during the interface detection period T4.

In detail, in the present embodiment, the driving circuit module 210 includes a driver circuit 212 and a pulse generation circuit 214. The driver circuit 212 transmits a data stream of the signal transmitter TX to the signal receiver RX. The pulse generation circuit 214 is coupled to the signal reception circuit 300, and generates and outputs the initialization pulse $S_{INI}$ during the initialization period T2, and generates and outputs the detection signal $S_{DET}$ during the interface detection period T4. Moreover, the pulse generation circuit 214 generates and provides the first voltage level $V_L$ during the rising period T1 before the initialization period T2 and during the pre-detection period T3 between the initialization period T2 and the interface detection period T4, so as to stablize the signal detection terminal 230 to the first voltage level $V_L$.

In the present embodiment, the pulse generation circuit 214 includes two resistors R connected in series and a control switch 215. The control switch 215 is controlled by a control signal Ctrl, and during the initialization period T2 and the interface detection period T4, the control signal Ctrl does not turn on the control switch 215, such that the pulse generation circuit 214 does not provide the first voltage level $V_L$. Conversely, during the rising period T1, the pre-detection period T3 and the discharging period T5, the control signal Ctrl turns on the control switch 215 to control the pulse generation circuit 214 to provide the first voltage level $V_L$. In detail, during the rising period T1, the control switch 215 is turned on, and the output signal S1 provided by the pulse generation circuit 214 is first increased from the third voltage level $V_{idle}$ to the first voltage level $V_L$, and is stablized to the first voltage level $V_L$. Then, before the detection pulse $S_{DET}$ is output, for example, during the initialization period T2, the control switch 215 is not turned on, and the pulse generation circuit 214 first outputs a wider initialization pulse $S_{INI}$ to the signal reception circuit 300. In the present embodiment, a time length of the initialization period T2 is long enough to increase the level of the initialization pulse $S_{INI}$ to the second voltage level $V_H$. The initialization pulse $S_{INI}$ can at least decrease the level of the input signal S2 to about the third voltage level $V_{idle}$ during the pre-detection period T3 to complete the initialization operation. Therefore, the initialization operation of the disclosure can ensure that the detection signal $S_{DET}'$ of the input signal S2 of the signal reception terminal 330 is not clamped to a specific voltage level for a long term when the pulse generation circuit 214 outputs the detection signal $S_{DET}$, i.e. during the interface detection period T4. In the present embodiment, the control switch 215 is turned on, and a time length of the pre-detection period T3 is long enough to discharge the signal reference level of the input signal S2 in the pre-detection period T3 to the third voltage level $V_{idle}$. Then, during the interface detection period T4, the control switch 215 is not turned on, and the pulse generation circuit 214 outputs the detection signal $S_{DET}$, and the signal detection module 220 accordingly detects the highest level of the detection signal $S_{DET}$ at the signal detection terminal 230.

The highest level that is not clamped can truly reflect a magnitude of the impedance of the equivalent input resistor $R_T$. Therefore, the signal transmission circuit 200 of the disclosure has the initialization function, and can detect the transmission interface standard used by the host to avoid misjudgement. Moreover, during the discharging period T5, the control switch 215 is turned on to discharge the output signal S1 to the first voltage level $V_L$.

In the present embodiment, since the signal transmission circuit 200 of the disclosure has the initialization function, the detection signal $S_{DET}'$ is avoided to be clamped to the first voltage level $V_L$, and in the present embodiment, the clamping level of the first voltage level $V_L$ is taken as an example for descriptions, though the disclosure is not limited thereto. In some embodiments, the clamping level is, for example, $V_{Clamp}$, and the initialization operation of the disclosure can discharge the signal reference level of the input signal S2 in the pre-detection period T3 to be lower than a voltage level $V_{Clamp}-(V_H-V_L)$. Therefore, even if the voltage level of the detection signal $S_{DET}$ of the output signal S1 is increased by $(V_H-V_L)$, the detection signal $S_{DET}'$ of the input signal S2 is not clamped, and can reflect the magnitude of the impedance of the equivalent input resistor $R_T$, so as to avoid misjudgement of the signal detection module 220.

Moreover, in the present embodiment, the method that the signal detection module 220 determines the type of the signal transmission interface of the signal reception circuit 300 includes determining whether a voltage of the detection signal $S_{DET}$ at the signal detection terminal 230 exceeds a voltage threshold value, or in an embodiment, determining whether a current of the detection signal $S_{DET}$ at the signal detection terminal 230 exceeds a current threshold value. Therefore, when the detection signal $S_{DET}$ satisfies the predetermined threshold value at the signal detection terminal 230, the signal detection module 220 determines the signal transmission interface of the signal reception circuit 300 to be the USB 2.0 and outputs a determination result signal S3, such that the corresponding electronic device can transmit signals to the host based on the USB 2.0 transmission standard according to the determination result signal S3. Conversely, when the detection signal $S_{DET}$ does not satisfy the predetermined threshold value at the signal detection terminal 230, the signal detection module 220 determines the signal transmission interface of the signal reception circuit 300 to be the USB 3.0 and outputs the determination result signal S3, such that the corresponding electronic device can transmit signals to the host based on the USB 3.0 transmission standard according to the determination result signal S3. Moreover, in the present embodiment, a pulse width of the detection signal $S_{DET}$ can be adjusted according to a determination level of the signal detection module 220, i.e. the aforementioned predetermined threshold value.

In the embodiment of FIG. 4, the output signal S1 includes a single initialization pulse $S_{INI}$. A pulse width of the detection signal $S_{DET}$ is smaller than a pulse width of the single initialization pulse $S_{INI}$, though the disclosure is not limited thereto. In another embodiment, the detection signal may also include a plurality of initialization pulses during the initialization period T2, which is described below.

Figure 6:
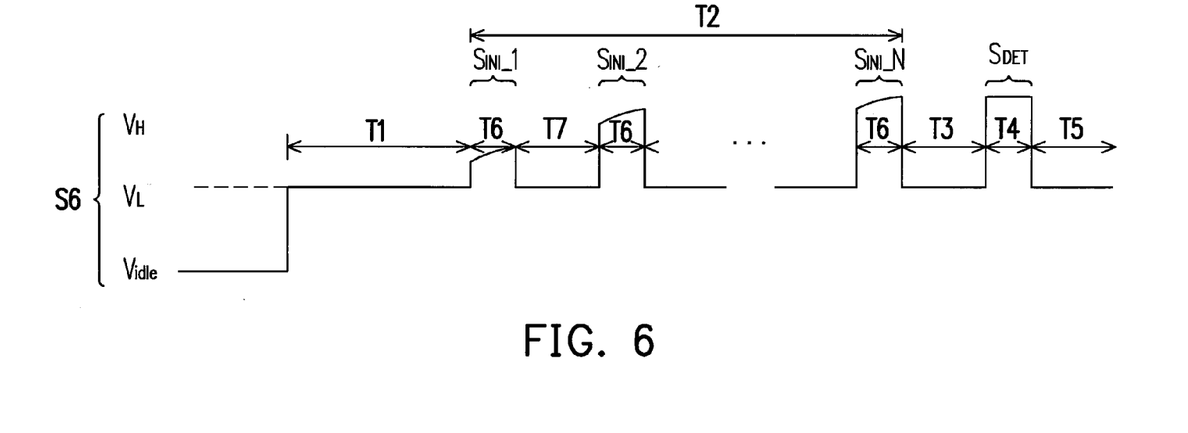
FIG. 6 is a schematic waveform diagram of an output signal S6 according to another embodiment of the disclosure.
Figure 7:
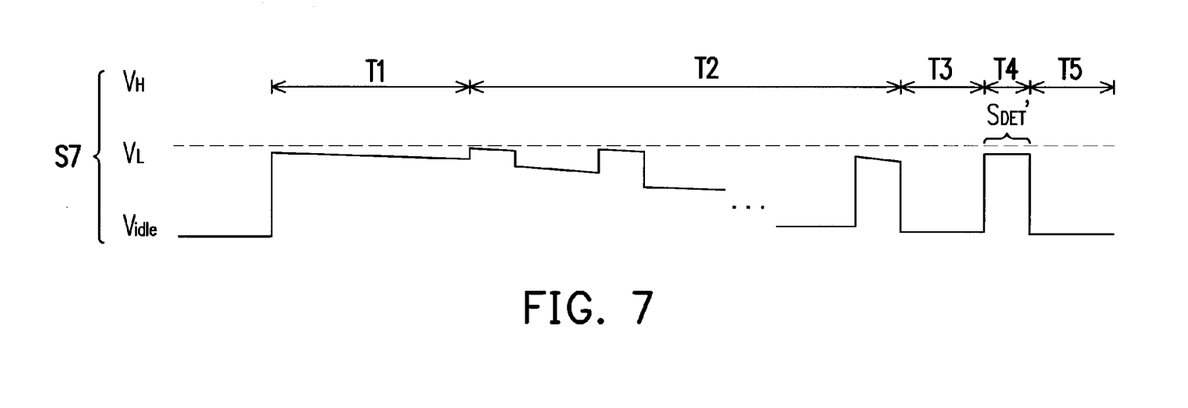
FIG. 7 is a waveform diagram of an input signal S7 of a signal detection terminal 230 when an equivalent input impedance $R_T$ has a high impedance.

FIG. 6 is a schematic waveform diagram of an output signal S6 according to another embodiment of the disclosure, and FIG. 7 is a waveform diagram of an input signal S7 of the signal detection terminal 230 when the equivalent input impedance $R_T$ has the high impedance. Referring to FIG. 1, FIG. 6 and FIG. 7, the waveform of the output signal S6 of the present embodiment is similar to that of the output signal S1 of FIG. 4, and a main difference there between is that the output signal S6 includes a plurality of initialization pulses $S_{INI\_1}$ to $S_{INI\_N}$ during the initialization period T2. In the present embodiment, the driving circuit module 210 generates the initialization pulses $S_{INI\_1}$ to $S_{INI\_N}$ during the initialization period T2 to initialize the input signal S7 before the interface detection period T4, such that a voltage level of the input signal S7 is about equal to the third voltage level $V_{idle}$ during the pre-detection period T3.

Therefore, during the interface detection period T4, the highest level of the detection signal $S_{DET}$ detected by the signal detection module 220 is not influenced and clamped by the ESD protection module 310.

In the present embodiment, pulse widths T6 of the initialization pulses are substantially equivalent or different, and in an example that the pulse widths T6 are substantial equivalent, each of the pulse widths T6 is substantially equal to the pulse width T4 of the detection signal $S_{DET}$. Moreover, in the present embodiment, time spaces T7 between each two of the initialization pulses are substantially equivalent or different, and in an example that the time spaces T7 are substantial equivalent, each of the time spaces T7 is substantially equal to a time length of the pre-detection period T3.

Comparing the output signal S1 of FIG. 4 and the output signal S6 of FIG. 6, the output signals S1 and S6 respectively include the single initialization pulse $S_{INI}$ and a plurality of initialization pulses $S_{INI\_1}$ to $S_{INI\_N}$ during the initialization period T2. In the disclosure, a pulse width of the single initialization pulse $S_{INI}$ is, for example, a sum of pulse widths of the initialization pulses $S_{INI\_1}$ to $S_{INI\_N}$, though the disclosure is not limited thereto. In some embodiments, the number of the initialization pulses and the sum of the pulse widths are applicable as long as the initialisation operation can be completed, which is not limited by the disclosure.

Figure 8:
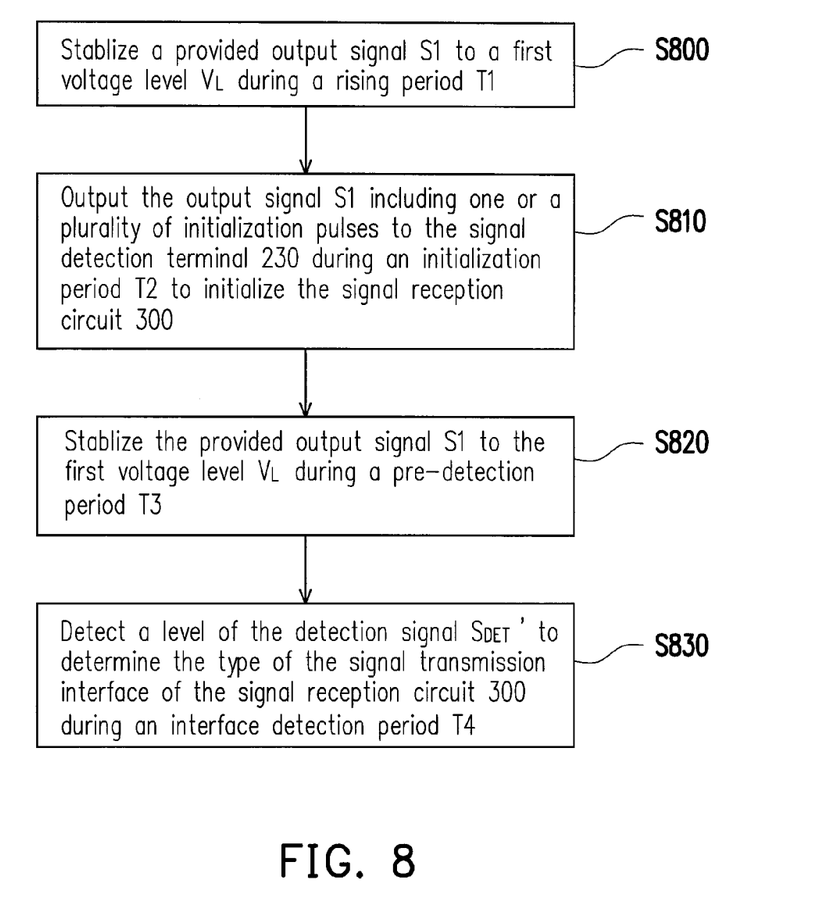
FIG. 8 is a flowchart illustrating a method for detecting a signal transmission interface according to an embodiment of the disclosure.

FIG. 8 is a flowchart illustrating a method for detecting a signal transmission interface according to an embodiment of the disclosure. Referring to FIG. 1C, FIG. 4 and FIG. 8, the method for detecting the signal transmission interface includes following steps. First, in step S800, during the rising period T1, the driving circuit module 210 stabilizes the provided output signal S1 to the first voltage level $V_L$. Then, in step S810, during the initialization period T2, the driving circuit module 210 outputs the output signal S1 including one or a plurality of initialization pulses to the signal detection terminal 230 to initialize the signal reception circuit 300. Then, in step S820, during the pre-detection period T3, the driving circuit module 210 stablizes the provided output signal S1 to the first voltage level $V_L$. Therefore, after the initialization operation during the initialization period T2, the signal reference level of the input signal S2 during the pre-detection period T3 is equal to the third voltage level $V_{idle}$. Then, in step S830, during the interface detection period T4, the signal detection module 220 detects the highest level of the detection signal $S_{DET}$ to determine the type of the signal transmission interface of the signal reception circuit 300. In an embodiment, according to different circuit designs, the signal detection module 220 can also detect the lowest level of the detection signal $S_{DET}$ to determine the type of the signal transmission interface of the signal reception circuit 300.

Moreover, those skilled in the art can learn enough instructions and recommendations of the method for detecting the signal transmission interface of the disclosure from the descriptions of the embodiments of FIG. 1A to FIG. 7, and details thereof are not repeated.

In summary, in the exemplary embodiments of the disclosure, the signal transmission circuit can initialize the signal reception circuit coupled thereto by using one or a plurality of an initialization pulse during the initialization period, so as to detect the level of the detection signal of the signal transmission terminal during the interface detection period, and determine the type of the signal transmission interface of the signal reception circuit.

The previously described exemplary embodiments of the present invention have many advantages, including properly determining the type of the signal transmission interface of the signal reception circuit, wherein the advantages aforementioned not required in all versions of the invention.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A signal transmission circuit of an electronic device, wherein the electronic device is coupled to a signal reception circuit of a host via the signal transmission circuit, the signal transmission circuit comprising:
   a driving circuit module, configured to provide at least one initialized signal and a detection signal, wherein the at least one initialized signal is output prior to the detection signal; and
   a signal detection module, coupled to the driving circuit module and coupled to the signal reception circuit via a signal detection terminal, wherein the signal detection module is configured to detect a type of a signal transmission interface of the signal reception circuit,
   wherein the at least one initialized signal configured to reduce a signal reference level of a reception terminal of the signal reception circuit, and the signal detection module determines the type of the signal transmission interface of the signal reception circuit according to whether the detection signal satisfies a predetermined threshold value at the signal detection terminal.

2. The signal transmission circuit of the electronic device as claimed in claim 1, wherein the driving circuit module comprises:
   a pulse generation circuit, coupled to the signal reception circuit, wherein the pulse generation circuit is configured to output the at least one initialized signal during an initialization period and output the detection signal during an interface detection period, and the pulse generation circuit is configured to provide a first voltage level before the initialization period and between the initialization period and the interface detection period, wherein the initialization period is prior to the interface detection period.

3. The signal transmission circuit of the electronic device as claimed in claim 1, wherein the at least one initialized signal reduces the signal reference level of the reception terminal of the signal reception circuit to a third voltage level, wherein the third voltage level is smaller than the first voltage level.

4. The signal transmission circuit of the electronic device as claimed in claim 1, wherein the detection signal comprises a detection pulse, and the signal detection module determines the type of the signal transmission interface of the signal reception circuit according to whether a voltage of the detection pulse at the signal detection terminal exceeds a voltage threshold value.

5. The signal transmission circuit of the electronic device as claimed in claim 1, wherein the detection signal comprises a detection pulse, and the signal detection module determines the type of the signal transmission interface of the signal reception circuit according to whether a current of the detection pulse at the signal detection terminal is lower than a current threshold value.

6. The signal transmission circuit of the electronic device as claimed in claim 1, wherein the type of the signal transmission interface of the signal reception circuit comprises a first type transmission interface and a second type transmission interface, and when the detection signal satisfies the predetermined threshold value at the signal detection terminal, the signal detection module determines the signal transmission interface of the signal reception circuit to be the first type transmission interface and outputs a determination result signal, such that the electronic device performs signal transmission with the host based on a transmission standard of the first type transmission interface according to the determination result signal.

7. The signal transmission circuit of the electronic device as claimed in claim 1, wherein the signal reception circuit comprises at least one unidirectional conductive device forward facing to the ground, so as to provide a circuit protection function to the signal reception circuit.

8. The signal transmission circuit of the electronic device as claimed in claim 2, wherein the pulse generation circuit is controlled by a control signal, and during the initialization period and the interface detection period, the control signal controls the pulse generation circuit not to provide the first voltage level, and before the initialization period and between the initialization period and the interface detection period, the control signal controls the pulse generation circuit to provide the first voltage level.

9. The signal transmission circuit of the electronic device as claimed in claim 2, wherein a level of the at least one initialized signal is between the first voltage level and a second voltage level, wherein the second voltage level is greater than the first voltage level.

10. The signal transmission circuit of the electronic device as claimed in claim 4, wherein the detection pulse of the detection signal at the signal detection terminal is not clamped to a specific voltage level.

11. The signal transmission circuit of the electronic device as claimed in claim 4, wherein the at least one initialized signal comprises a single initialization pulse, and a pulse width of the detection pulse is smaller than a pulse width of the single initialization pulse.

12. The signal transmission circuit of the electronic device as claimed in claim 4, wherein the at least one initialized signal comprises a plurality of initialization pulses, and a pulse width of the detection pulse is substantially equal to a pulse width of each of the initialization pulses.

13. The signal transmission circuit of the electronic device as claimed in claim 6, wherein when the detection signal does not satisfy the predetermined threshold value at the signal detection terminal, the signal detection module determines the signal transmission interface of the signal reception circuit to be the second type transmission interface and outputs the determination result signal, such that the electronic device performs signal transmission with the host based on a transmission standard of the second type transmission interface according to the determination result signal.

14. A method for detecting a signal transmission interface, adapted to a signal transmission circuit of an electronic device, wherein the signal transmission circuit is coupled to a signal reception circuit of a host via a signal detection terminal, the method for detecting the signal transmission interface comprising:

outputting at least one initialized signal during an initialization period to reduce a signal reference level of a reception terminal of the signal reception circuit;

outputting a detection signal during an interface detection period to detect a type of the signal transmission interface of the signal reception circuit; and determining the type of the signal transmission interface of the signal reception circuit according to whether the detection signal satisfies a predetermined threshold value at the signal detection terminal, wherein the at least one initialized signal is output prior to the detection signal.

15. The method for detecting the signal transmission interface as claimed in claim 14, further comprising:

providing a first voltage level before the initialization period and between the initialization period and the interface detection period, so as to stablize the signal detection terminal to the first voltage level.

16. The method for detecting the signal transmission interface as claimed in claim 14, wherein in the step of reducing the signal reference level of the reception terminal of the signal reception circuit, the at least one initialized signal reduces the signal reference level of the reception terminal of the signal reception circuit to a third voltage level, wherein the third voltage level is smaller than the first voltage level.

17. The method for detecting the signal transmission interface as claimed in claim 14, wherein the detection signal comprises a detection pulse, and the step of determining the type of the signal transmission interface of the signal reception circuit comprises determining the type of the signal transmission interface of the signal reception circuit according to whether a voltage of the detection pulse at the signal detection terminal exceeds a voltage threshold value.

18. The method for detecting the signal transmission interface as claimed in claim 14, wherein the detection signal comprises a detection pulse, and the step of determining the type of the signal transmission interface of the signal reception circuit comprises determining the type of the signal transmission interface of the signal reception circuit according to whether a current of the detection pulse at the signal detection terminal is lower than a current threshold value.

19. The method for detecting the signal transmission interface as claimed in claim 14, wherein the signal reception circuit comprises at least one unidirectional conductive device forward facing to the ground, so as to provide a circuit protection function to the signal reception circuit.

20. The method for detecting the signal transmission interface as claimed in claim 14, wherein the type of the signal transmission interface of the signal reception circuit comprises a first type transmission interface and a second type transmission interface, and the step of determining the type of the signal transmission interface of the signal reception circuit comprises:

determining the signal transmission interface of the signal reception circuit to be the first type transmission interface when the detection signal does not satisfy the predetermined threshold value at the signal detection terminal; and determining the signal transmission interface of the signal reception circuit to be the second type transmission interface when the detection signal satisfies the predetermined threshold value at the signal detection terminal.

21. The method for detecting the signal transmission interface as claimed in claim 15, wherein a level of the at least one initialized signal is between the first voltage level and a second voltage level, wherein the second voltage level is greater than the first voltage level.

22. The method for detecting the signal transmission interface as claimed in claim 17, wherein the detection pulse of the detection signal at the signal detection terminal is not clamped to a specific voltage level.

23. The method for detecting the signal transmission interface as claimed in claim 17, wherein the at least one initialized signal comprises a single initialization pulse, and a pulse width of the detection pulse is smaller than a pulse width of the single initialization pulse.

24. The method for detecting the signal transmission interface as claimed in claim 17, wherein the at least one initialized signal comprises a plurality of initialization pulses, and a pulse width of the detection pulse is substantially equal to a pulse width of each of the initialization pulses.

25. The method for detecting the signal transmission interface as claimed in claim 20, further comprising:

outputting a determination result signal, such that the electronic device performs signal transmission with the host based on a transmission standard of the first type transmission interface or the second type transmission interface according to the determination result signal.

* * * * *